(12) United States Patent
Peddada et al.

(10) Patent No.: US 11,743,044 B2
(45) Date of Patent: Aug. 29, 2023

(54) PASSWORD-LESS AUTHENTICATION USING KEY AGREEMENT AND MULTI-PARTY COMPUTATION (MPC)

(71) Applicant: salesforce.com, inc., San Francisco, CA (US)

(72) Inventors: Prasad Peddada, Alameda, CA (US); Taher Elgamal, Atherton, CA (US); Vishal Agarwal, Woodinville, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/480,806

(22) Filed: Sep. 21, 2021

(65) Prior Publication Data

US 2023/0089865 A1 Mar. 23, 2023

(51) Int. Cl.
*H04L 9/30* (2006.01)
*H04L 9/08* (2006.01)
*H04L 9/32* (2006.01)

(52) U.S. Cl.
CPC .......... *H04L 9/3073* (2013.01); *H04L 9/0841* (2013.01); *H04L 9/0877* (2013.01); *H04L 9/3271* (2013.01)

(58) Field of Classification Search
CPC ... H04L 9/3073; H04L 9/0841; H04L 9/0877; H04L 9/3271
See application file for complete search history.

(56) References Cited

U.S. PATENT DOCUMENTS

| | | | | |
|---|---|---|---|---|
| 9,787,661 | B2 * | 10/2017 | Naslund | H04L 63/0853 |
| 10,742,421 | B1 * | 8/2020 | Wentz | H04L 9/0897 |
| 2007/0258585 | A1 * | 11/2007 | Sandhu | H04L 9/302 380/44 |
| 2009/0210712 | A1 * | 8/2009 | Fort | H04L 63/1441 713/175 |
| 2016/0366109 | A1 * | 12/2016 | Lablans | G06Q 20/34 |
| 2018/0062863 | A1 * | 3/2018 | Baskaran | H04L 63/067 |
| 2018/0212785 | A1 * | 7/2018 | Peddada | H04W 12/069 |
| 2020/0100108 | A1 * | 3/2020 | Everson | H04W 12/068 |
| 2021/0184842 | A1 * | 6/2021 | Nix | H04L 9/3263 |

* cited by examiner

*Primary Examiner* — Shanto Abedin
(74) *Attorney, Agent, or Firm* — Sterne, Kessler, Goldstein & Fox P.L.L.C.

(57) ABSTRACT

Multiple systems, methods, and computer program product embodiments for password-less authentication using key agreement and multi-party computation (MPC). In one or more embodiments, following an authentication request received by a host computing device, the host computing device and a user computing device generate a shared key using a key agreement algorithm. Then, the host computing device generates a challenge that is encrypted using the shared key and transmitted to the user computing device. The user computing device decrypts the challenge after regenerating the shared key and sends the decrypted result to the host computing device as the challenge response. The authentication request is granted by the host computing device if the challenge and the challenge response match. New keys and a new challenge are generated for each authentication request. This process relies on public key cryptography eliminating the needs for passwords.

20 Claims, 6 Drawing Sheets

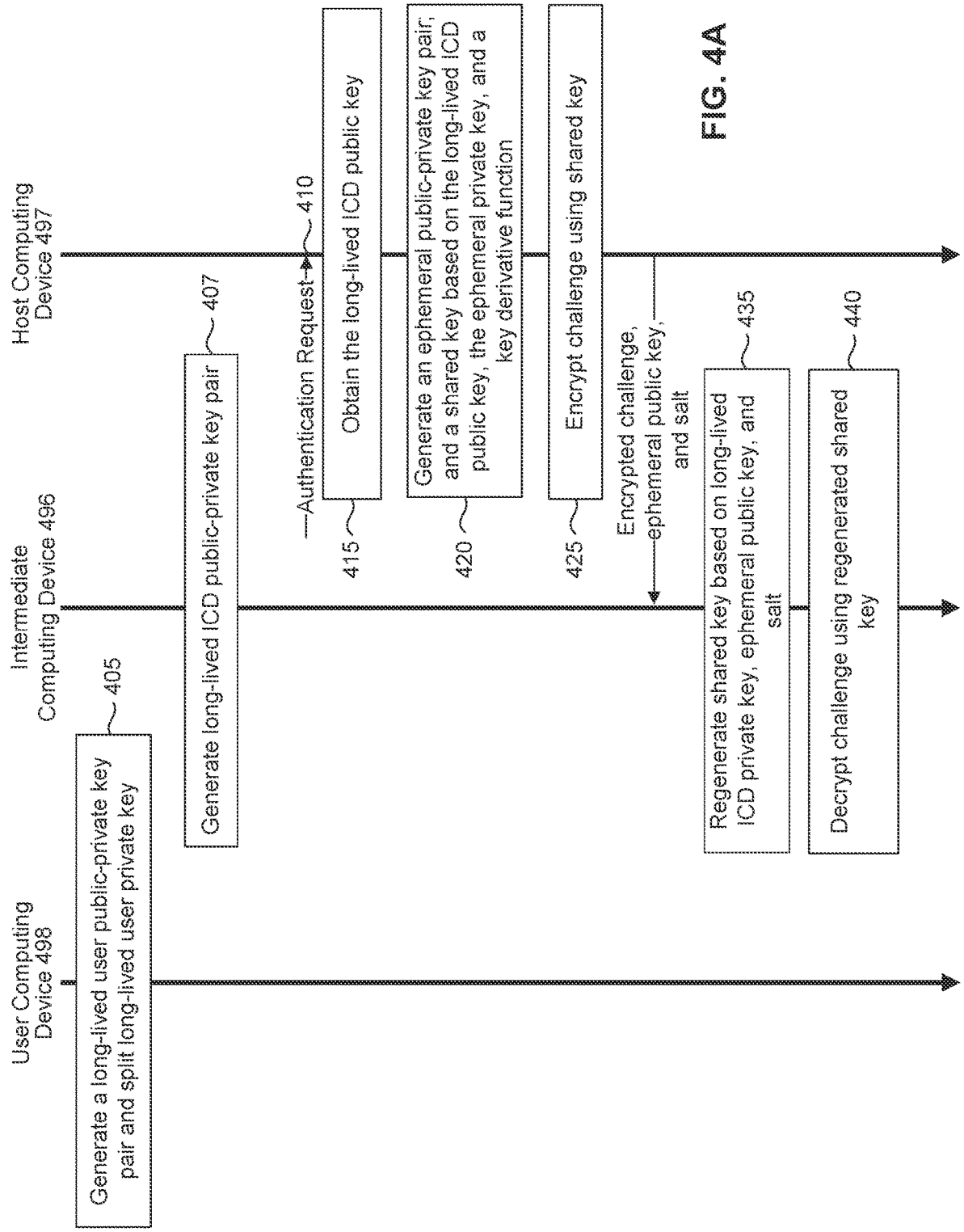

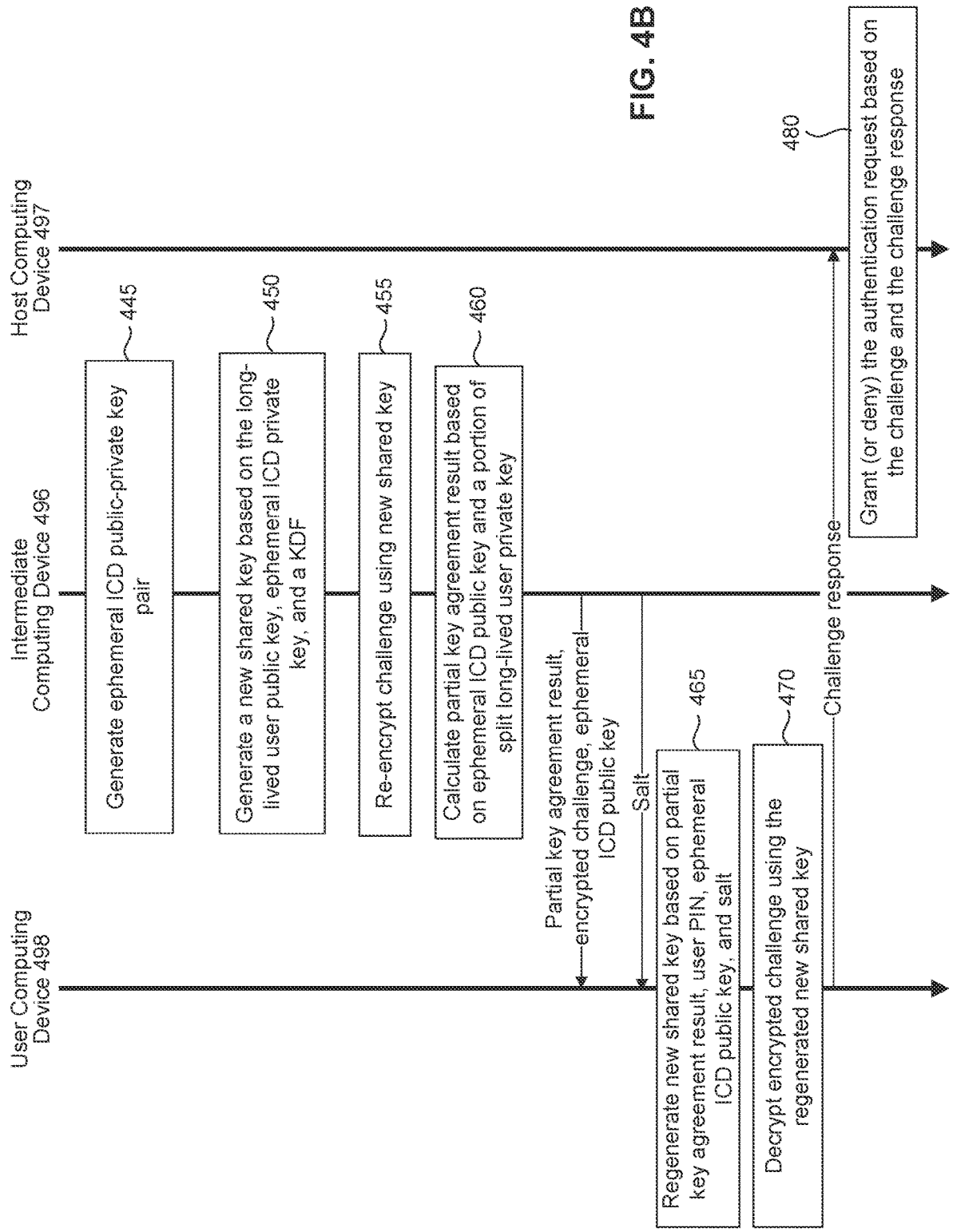

PASSWORD-LESS AUTHENTICATION USING KEY AGREEMENT AND MULTI-PARTY COMPUTATION (MPC)

BACKGROUND

Preventing unauthorized access to computing devices is very important in the online world. This is especially true considering cyberattacks are becoming increasingly common. Passwords are a commonly used tool to control access to computing devices. However, the passwords (or hashed versions of the passwords) must be stored somewhere, and this storage location is a security vulnerability.

BRIEF DESCRIPTION OF THE DRAWINGS/FIGURES

The accompanying drawings are incorporated herein and form a part of the specification.

Figure 1:
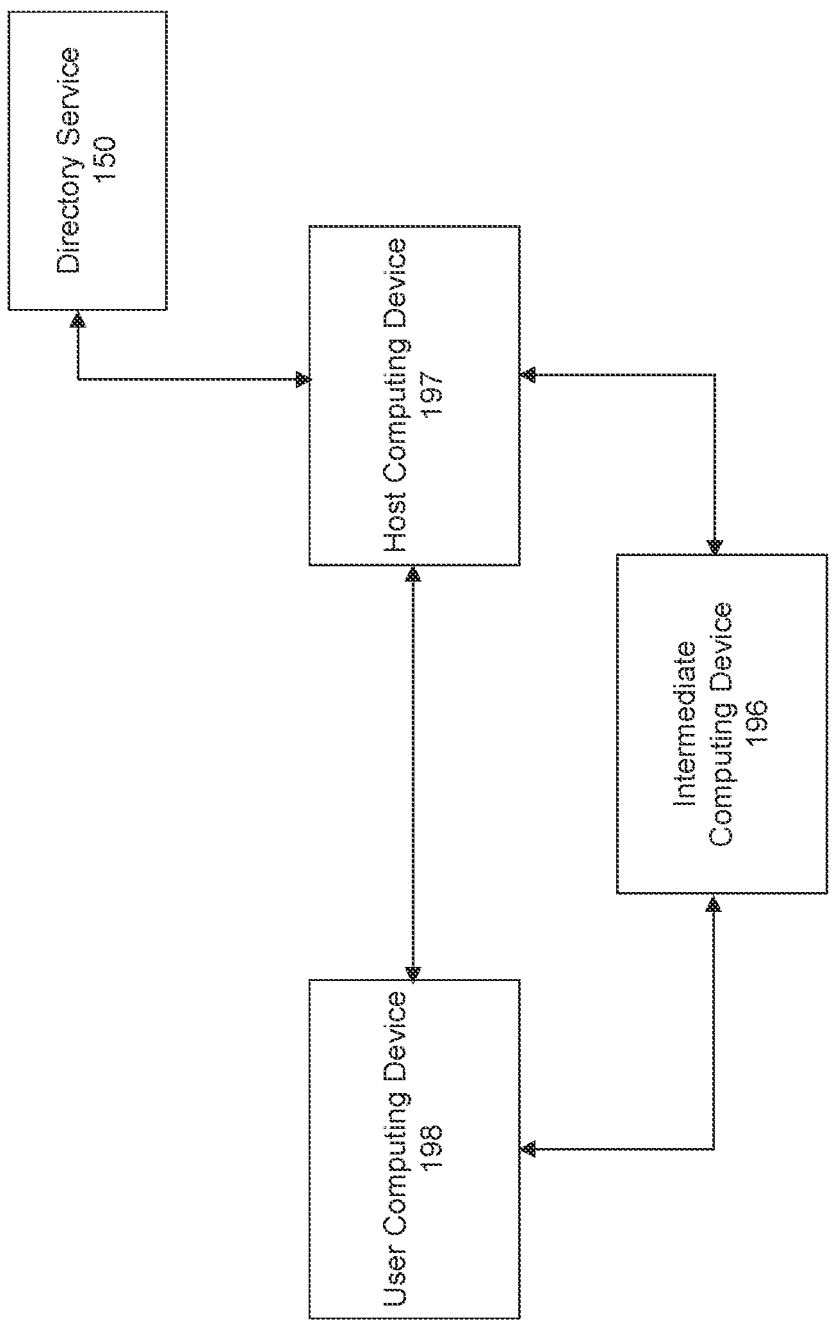

FIG. 1 shows a system for password-less authentication using key agreement and multi-party computation (MPC) in accordance with one or more embodiments.

FIGS. 2, 3, 4A, and 4B show flow diagrams for password-less authentication using key agreement and MPC in accordance with one or more embodiments.

Figure 5:
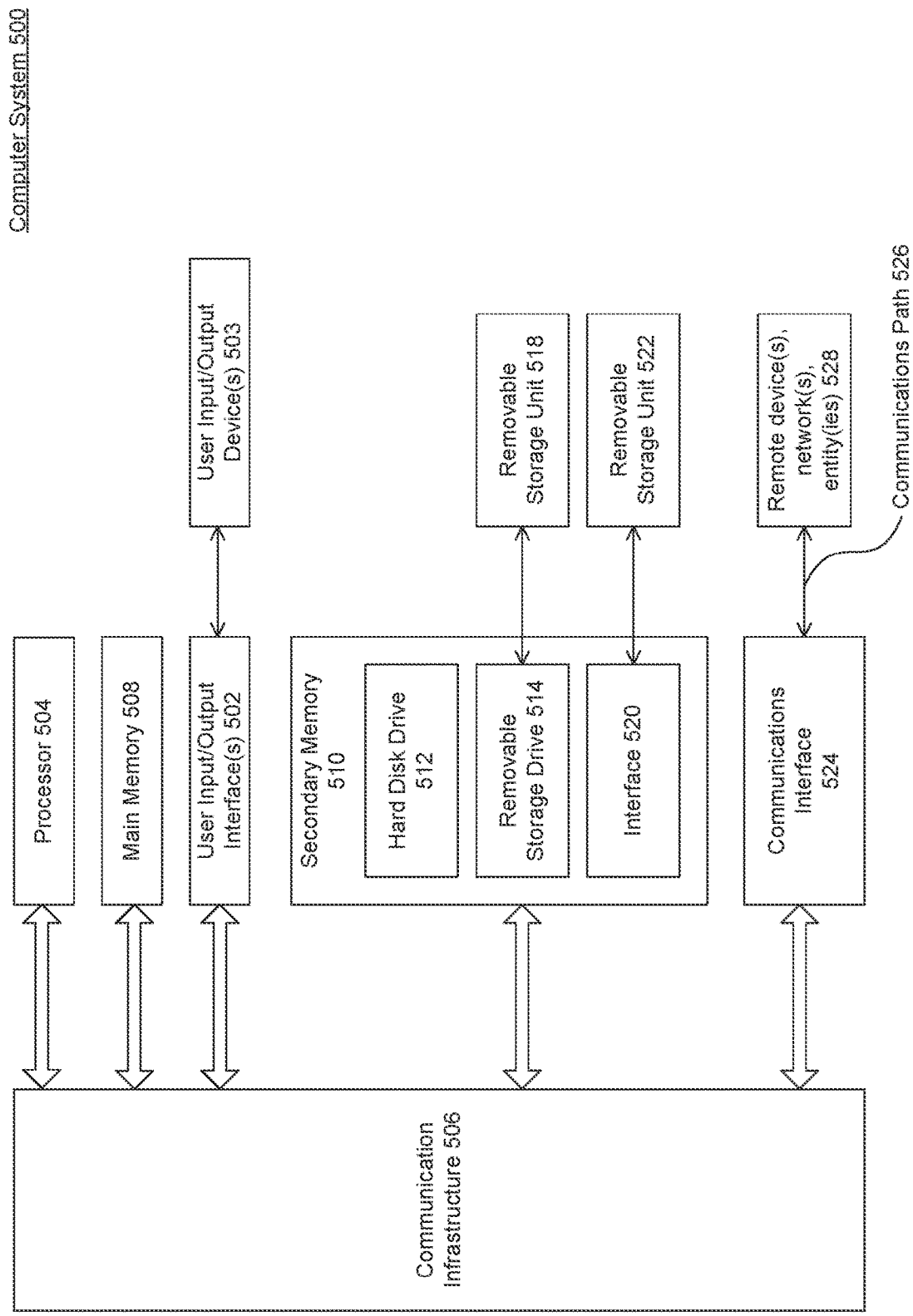

FIG. 5 shows an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method, and/or computer program product embodiments for password-less authentication using key agreement and multiparty computation (MPC). In one or more embodiments, following an authentication request received by a host computing device, the host computing device and a user computing device generate a shared key using a key agreement algorithm. Then, the host computing device generates a challenge that is encrypted using the shared key and transmitted to the user computing device. The user computing device decrypts the challenge using the shared key and proves to the challenger (e.g., via a challenge response) successful decryption of the challenge. The authentication request is granted if the challenge and the challenge response match. New keys and a new challenge are generated for each authentication request. This process relies on public key cryptography eliminating the need for passwords.

FIG. 1 shows a system for password-less authentication using key agreement and multiparty computation (MPC). As shown in FIG. 1, the system has multiple components including, for example, a user computing device 198, an intermediate computing device (ICD) 196, and a host computing device 197. Each of the user computing device 198, the ICD 196, and the host computing device 197 may correspond to a desktop PC, a laptop, a tablet PC, a smart phone, a personal digital assistant (PDA), a server, a mainframe, a kiosk, etc. All of the components may communicate (e.g., exchange data such as encryption keys, etc. (discussed below)) using wired and/or wireless technology (e.g., Ethernet, infrared, Bluetooth, cellular, fiber optics, WiFi, etc.).

In one or more embodiments, the host computing device 197 receives authentication requests from one or more users. These authentication requests may be associated with login requests, requests to execute software applications managed by the host computing device 197, and/or requests to read/write data (e.g., files) managed by the host computing device 197, etc. A user may be physically near the host computing device 197 (e.g., the user and the host computing device 197 may be in the same room). In such scenarios, the user may operate the interface of the host computing device (e.g., keyboard, mouse, touchscreen, etc.) to generate the access request. Additionally or alternatively, the user may be remote from the host computing device 197 and the authentication requests may be transmitted to the host computing device 197 (e.g., over the Internet) using another computing device such as user computing device 198. In one or more embodiments, these authentication requests and the processing of the authentication requests do not require the host computing device 197 (or any other computing device) to manage a password or symmetric key for the user. Accordingly, this eliminates or at least mitigates the security vulnerabilities and other difficulties associated with passwords and symmetric key systems.

In one or more embodiments, each of the user computing device 198, the host computing device 197, and the ICD 196 are configured to generate public-private key pairs. Moreover, public-private key pairs may be ephemeral or long-lived. Ephemeral public-private key pairs are used for a low number of authentication requests (e.g., only one authentication request). In contrast, long-lived public-private key pairs are used for multiple authentication requests. For example, each component may be configured to generate elliptic-curve (EC) public-private keys pairs. A long-lived public-private key pair generated by the user computing device 198 may be referred to as a long-lived user public-private key pair. A long-lived public-private key pair and an ephemeral public-private key pair generated by the ICD 196 may be referred to as a long-lived ICD public-private key pair and an ephemeral ICD public-private key pair, respectively. An ephemeral public-private key pair generated by the host computing device 197 may be referred to as an ephemeral host public-private key pair.

In one or more embodiments, any two of the components (e.g., host computing device 197 and ICD 196, host computing device 197 and user computing device 198, ICD 196 and user computing device 198) may be configured to generate a shared key. For example, the shared key may be generated using the EC public-private keys of the two components, the Elliptic-curve Diffie-Hellman (ECDH) key protocol, and a key derivative function (KDF), discussed below.

Although FIG. 1 only shows a single user computing device 198, in other embodiments, there may be multiple users each having their own user computing device for transmitting access requests to host computing device 197. Additionally or alternatively, although FIG. 1 only shows a single host computing device 197, in other embodiments, there may be multiple host computing devices. A user may transmit access requests to multiple host computing devices.

As shown in FIG. 1, the system may include directory service 150. Directory service 150 may be a software application executing on another computing device (not shown). As discussed above, each user computing device 198 may generate a long-lived user public-private key pair. In one or more embodiments, directory service 150 may store the long-lived user public key of each user public-private key pair, along with an identifier (e.g., username) of the user associated with the user computing device 198 that generated the long-lived user public-private key pair. Directory service 150 may respond to look-up requests specifying identifiers (e.g., from the host computing device 197) with the long-lived user public keys corresponding to the identifiers (discussed below in reference to FIG. 2 and FIG. 3). There may be a directory service for each host computing device 197. Additionally or alternatively, each host computing device 197 may include a file storing all the long-lived user public keys.

In one or more embodiments, the ICD 196 may store all the long-lived user public keys (discussed below in reference to FIG. 4A and FIG. 4B). Further, the ICD 196 may store a portion of each long-lived user private key (discussed below in reference to FIGS. 3, 4A, and 4B). In addition to key generation, key management, and key storage functionality, ICD 196 may also act as an identity service. Those skilled in the art, having the benefit of this disclosure, will appreciate that an identity service encompasses more than just authentication and thus authentication itself is by no means the only function performed by an identity service.

Figure 2:
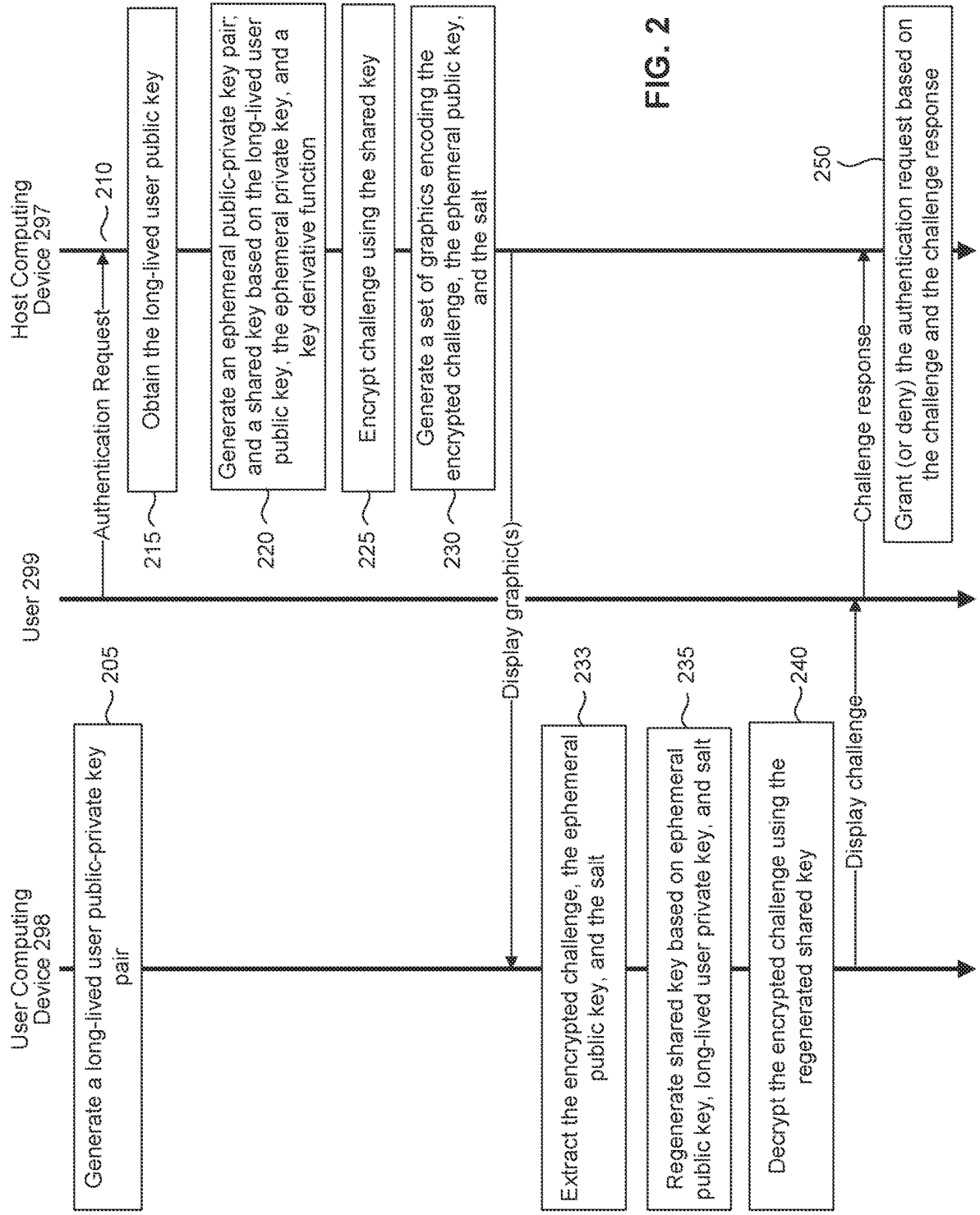

FIG. 2 shows a flow diagram for password-less authentication using key agreement and MPC in accordance with one or more embodiments. As shown, the flow diagram involves interactions between a user 299, a user computing device 298, and a host computing device 297. The user computing device 298 and the host computing device 297 may correspond to user computing device 198 and host computing device 197, respectively, discussed above in reference to FIG. 1. The user computing device 298 may correspond to a mobile computing device (e.g., smart phone, tablet PC, personal digital assistant (PDA), etc.) operated by the user 299, and the host computing device 297 may correspond to a desktop PC, a laptop PC, a tablet PC, a kiosk, a terminal, etc. The process depicted in FIG. 2 does not require the host computing device 297 to store a password for the user 299.

At 205, a long-lived user public-private key pair is generated. In other words, a long-lived user public key and a long-lived user private key are generated. The long-lived user public-private key pair may be an elliptic-curve (EC) public-private key pair generated based on a set of domain parameters. Accordingly, the long-lived user private key may be a randomly selected integer, while the long-lived user public key may be represented by a point that is based on the randomly selected integer and a generator point. The long-lived user public key may be sent (not shown) to the host computing device 297 or stored in some location that is accessible to the host computing device 297. The long-lived user private key may be split into N portions. For example, when N is 3, one portion may be stored on the user computing device 298, one portion may be stored on the host computing device 297, while the remaining portion may be a personal identification number (PIN) known only to the user 299.

At 210, the host computing device 297 receives an authentication request (e.g., login request) associated with the user 299. The user 299 may be sitting in front of the host computing device 297 and interacting with a displayed GUI to generate the access request or opening a terminal on the host computing device 297. The access request may include an identifier for the user such as a username, an employee number, a student ID, identification number, etc.

At 215, the host computing device 297 obtains the long-lived user public key (generated in 205). As discussed above, the long-lived user public key may be stored in a location accessible to both the user computing device 298 and the host computing device 297. The host computing device 297 may extract the identifier (e.g., identification number) from the access request and retrieve the long-lived user public key corresponding to the identifier.

At 220, an ephemeral public-private key pair is generated. In other words, a ephemeral public key and an ephemeral private key are generated. The generated ephemeral public-private key pair may be an elliptic-curve (EC) public-private key pair. In such scenarios, the ephemeral public-private key pair is generated using the same domain parameters as used in 205.

Still referring to 220, a shared key is generated based on the ephemeral private key and the long-lived user public key. Generating the shared key may include generating an auxiliary key based on the Elliptic-curve Diffie-Hellman (ECDH) key protocol, which utilizes the ephemeral private key on the host computing device and the long-lived user public key, and then applying the auxiliary key to a key derivation function (KDF). The KDF inputs the auxiliary key and an optional salt which acts as a cryptographic salt. The salt may be a random number generated by the host computing device 297 in response to the authentication request. Additionally or alternatively, the salt may be the value of some memory location or register in the host computing device 297 at the time the authentication request is received. In one or more embodiments, the salt may be based on the time (e.g., any combination of hours, minutes, seconds, etc.) that the authentication request was received by the host computing device 297. The KDF may be based on a hash-based message authentication code (HMAC). Other KDF algorithms may also input an optional iterations number. The output of the KDF is the shared key. The shared key may be an Advanced Encryption Standard (AES) key. In one or more embodiments, the KDF is omitted, in which case the shared key and the auxiliary key are the same.

At 225, a challenge is generated and encrypted by the shared key. The challenge may be a random number or random string generated by the host computing device 297. At 230, a set of graphics (i.e., one or more graphics) are generated. The set of graphics encode the encrypted challenge (from 225), the ephemeral public key (from 220), and the salt and/or iterations number (if used). The one or more graphics are displayed on a display device (e.g., monitor) of the host computing device 297. If the set of graphics has two or more graphics, then the graphics may be displayed consecutively. The graphics may be 2D barcodes such as quick response (QR) codes.

At 233, the user computing device 298 is used to extract the encrypted challenge, the ephemeral public key, and the salt from the displayed set of graphics. This may involve positioning the user computing device 298 (e.g., smart phone) in front of the display device of the host computing device 297, taking one or more images of the displayed graphics (e.g., 2D barcodes) using the camera of the user computing device 298, and then using an application on the user computing device 298 to extract the encrypted challenge, the ephemeral public key, and the salt and/or iterations number (if used) from the one or more images.

At 235, the shared key (from 225) is regenerated by the user computing device 298. This may include regenerating the auxiliary key (from 220) based on the ephemeral public key (as extracted at 233) and the long-lived user private key using the ECDH key protocol. If the long-lived user private key has been split into three portions (discussed above in reference to 205), then regenerating the auxiliary key may involve: (1) computing a partial key agreement result based on first portion (e.g., stored in the host computing device 297) and the ephemeral public key; (2) transmitting the partial key agreement to the user computing device 298; and (3) completing the key agreement based on the received partial key agreement result, the second portion (e.g., PIN provided by user), the third portion stored in the user computing device 298, and the ephemeral public key. Then, the shared key is regenerated by applying the same KDF to the regenerated auxiliary key with the salt and/or iterations number (as extracted at 233).

At 240, the encrypted challenge is decrypted using the regenerated shared key. The challenge may be displayed (e.g., in plaintext) to the user on the user computing device 298. The user provides proof of successful decryption of the challenge issued by the host computing device as the challenge response. For example, the user may type the displayed challenge into the host computing device 297 as a challenge response. Additionally or alternatively, the user computing device 298 may transmit (e.g., by text message, by email, by infrared communication, by Bluetooth, by any long or short distance wireless standard, etc.) the decrypted challenge to the host computing device 297 as the challenge response. Additionally or alternatively, the user computing device 298 may hash the challenge before displaying the challenge or transmitting the challenge, and the hashed challenge is the challenge response.

At 250, the received challenge response is compared with the challenge (from 225). If there is a match, the user's authentication request (e.g., login request) is granted. If there is not a match, the user's access request is denied. If the challenge response is the result of hashing, the challenge needs to be hashed before the comparison can be executed.

Although in FIG. 2 the salt is shown as being encoded in a set of graphics (in 230), in other embodiments, the salt may be transmitted to the user computing device 298 via email, SMS, displayed on the display device of the host computing device 297 and entered into the user computing device 298 by the user, or by some other wired or wireless channel separate from the channel/method used to transmit the ephemeral public key and the encrypted challenge to the user mobile device 298.

Those skilled in the art, having the benefit of this detailed description, will appreciate that a new ephemeral public-private key pair, a new challenge, and a new salt or iterations number (if used) are generated for each authentication request, which increases the security of the authentication process. Further, the process depicted in FIG. 2 does not utilize passwords and thus overcomes the many issues associated with passwords such as, for example, securely storing the password, users forgetting passwords, users re-using old passwords, software that logs keystrokes, etc.

In one or more embodiments, to prevent or reduce the likelihood of a successful race condition attack, host computing device 297 may generate a nonce (e.g., a code) in response to the authentication request. The nonce may be displayed by host computing device 297. Host computing device 297 may cause a set of nonces (including the displayed nonce) to be displayed on user computing device 298. The user may need to select, from among the set of nonces, the nonce matching the nonce displayed by host computing device 297. The selection may be transmitted with the challenge response (or be part of the challenge response) to the host computing device. In one or more embodiments, the authentication request is only successful if the correct (e.g., matching) selection is made by the user. In one or more embodiments, the salt (used for the KDF) and the nonce are the same. In one or more embodiments, the salt and the nonce are different. In one or more embodiments, the salt is combined with the nonce before it is inputted into the KDF to generate the shared key. In one or more embodiments, the nonce may be a separate input to the KDF.

Figure 3:
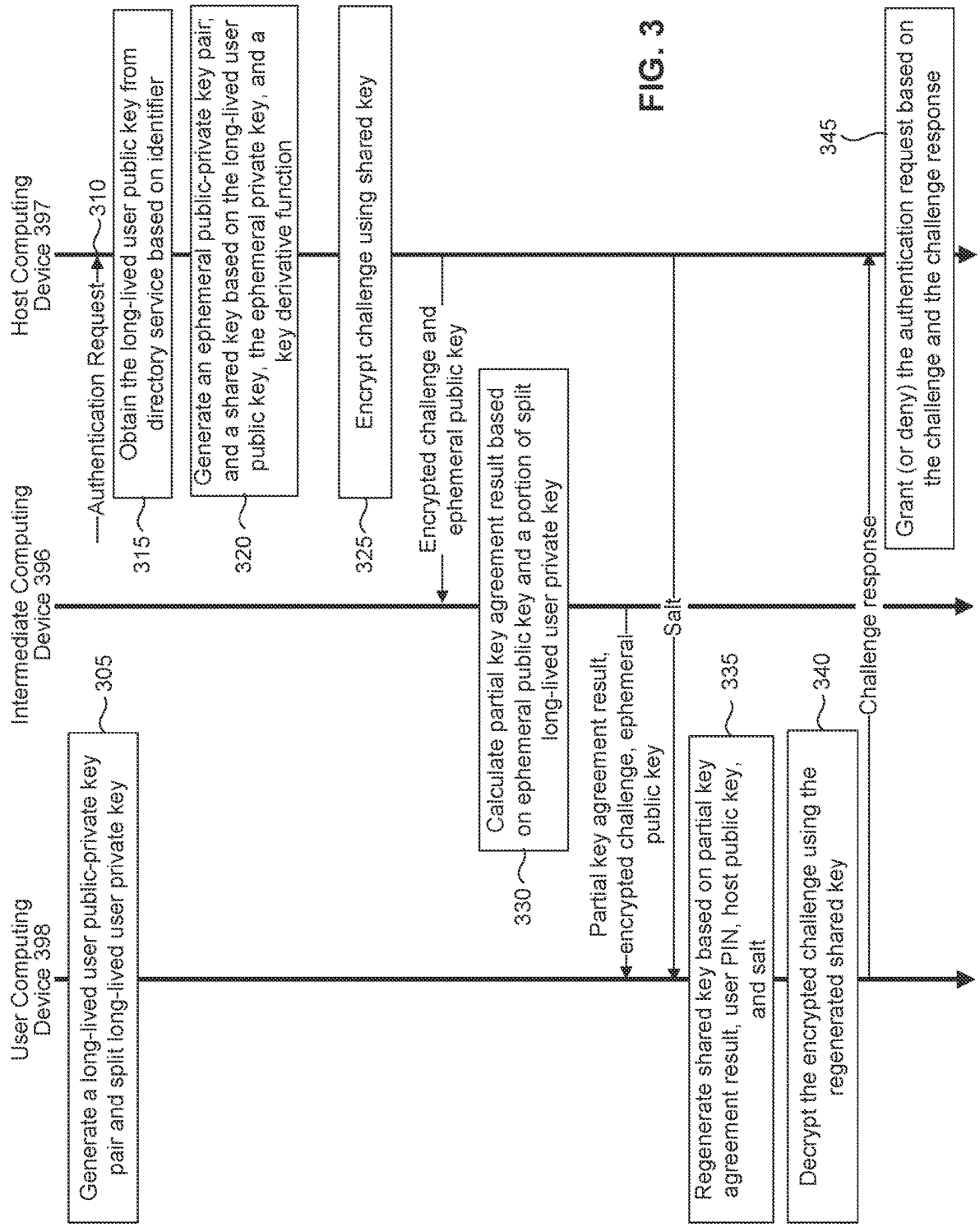

FIG. 3 shows a flow diagram for password-less authentication using key agreement and MPC in accordance with one or more embodiments. As shown, the flow diagram involves interactions between a user computing device 398, a host computing device 397, and an intermediate computing device 396. The user computing device 398, the host computing device 397, and the intermediate computing device 396 may correspond to user computing device 198, host computing device 197, and intermediate computing device 196, respectively, discussed above in reference to FIG. 1. The user computing device 398 may correspond to a desktop PC, a laptop PC, a tablet PC, a smart phone, a terminal, a kiosk, etc. The host computing device 397 and the intermediate computing device 396 may correspond to a server, a mainframe, a desktop PC, a container in a data center, etc. The process depicted in FIG. 3 does not require the host computing device 397 to store a password for the user.

At 305, a long-lived user public-private key pair is generated. In other words, a long-lived user public key and a long-lived user private key are generated. The long-lived user public-private key pair may be an EC public-private key pair generated based on a set of domain parameters. Accordingly, the long-lived user private key may be a randomly selected integer, while the long-lived user public key may be represented by a point that is based on the randomly selected integer and a generator point. The long-lived user public key may be sent to a directory service (not shown) and/or stored in some location (e.g., file) that is accessible to the host computing device 397. The long-lived user private key may be split into N portions. For example, when N is 3, one portion may be stored on the user computing device 398, one portion may be stored on the intermediate computing device 396, while the other portion may be a personal identification number (PIN) known only to the user.

At 310, the host computing device 397 receives an authentication request (e.g., login request) associated with the user. The user might be attempting to remotely access (e.g., over the internet) the host computing device 397 via the user computing device 398 (or another computing device not shown). The access request may include an identifier for the user such as a username, an employee number, a student ID, identification number, etc.

At 315, the host computing device 397 obtains the long-lived user public key (generated in 305). The host computing device 397 may extract the identifier (e.g., identification number) from the access request and send the identifier to a directory service (e.g., directory service 150) storing the long-lived user public key. The directory service may respond with the long-lived user public key corresponding to the identifier. Additionally or alternatively, the host computing device 397 may access a file storing multiple long-lived user public keys and use the identifier to select the long-lived public key corresponding to the user.

At 320, an ephemeral public-private key pair is generated on the host computing device. In other words, an ephemeral public key and an ephemeral private key are generated. The generated ephemeral public-private key pair may be an EC public-private key pair. In such scenarios, the ephemeral public-private key pair is generated using the same domain parameters as used at 305.

Still referring to 320, a shared key is generated based on the ephemeral private key and the long-lived user public key (from 315). This may include first generating an auxiliary key according to the ECDH key protocol, and then applying the auxiliary key to a KDF. The KDF inputs the auxiliary key and an optional salt which acts as a cryptographic salt. The salt may be a random number generated by the host computing device 397 in response to the authentication request. Additionally or alternatively, the salt may be the value of some memory location or register in the host computing device 397 at the time the authentication request is received. In one or more embodiments, the salt may be based on the time (e.g., any combination of hours, minutes, seconds, etc.) that the authentication request was received by the host computing device 397. Some KDF algorithms may also input an optional iterations number The output of the KDF is the shared key. The shared key may be an Advanced Encryption Standard (AES) key. In one or more embodiments, the KDF is omitted, in which case the shared key is the auxiliary key.

At 325, a challenge is generated and encrypted by the shared key. The challenge may be a random number or random string generated by the host computing device. Then, the encrypted challenge and the ephemeral public key are transmitted to the intermediate computing device 396. The identifier (from 315) may also be transmitted to the intermediate computing device 396.

At 330, if the long-lived user private key has been split into multiple portions with one of the portions stored with the intermediate computing device 396 (discussed above in reference to 205), then the intermediate computing device 396 calculates a partial key agreement result based on the portion of the long-lived user private key stored in the intermediate computing device 396 and the ephemeral public key (received from the host computing device 397). As the intermediate computing device 396 may store portions for multiple long-lived user private keys for multiple users, the intermediate computing device 396 may use the identifier (also received from the host computing device 397) to retrieve the portion of the long-lived user private key associated with the user trying to be authenticated by the host computing device 397. Then, the partial key agreement, the encrypted challenge, and the ephemeral public key may be transmitted to the user computing device 398.

In one or more embodiments, the encrypted challenge is transmitted from the host computing device 397 to the user computing device 398, bypassing the intermediate computing device 396. In one or more embodiments, if a salt was used to generate the shared key in 320, then the salt may be transmitted to the user computing device 398 via email, SMS, or by some other wired or wireless channel separate from the channel/method used to transmit the ephemeral public key and the encrypted challenge to the intermediate computing device 396 and/or user computing device 398.

At 335, the shared key (from 325) is regenerated by the user computing device 398. This may include regenerating the auxiliary key (from 320) based on the ephemeral public key and the long-lived user private key using the ECDH key protocol. Regenerating the auxiliary key may involve completing the key agreement based on the partial key agreement result (as received from the intermediate computing device), the second portion of the long-lived user private key stored by the user computing device 398, the third portion of the user private key (e.g., PIN provided by user), and the ephemeral public key. Then, the shared key is regenerated by applying the same KDF to the regenerated auxiliary key with the received salt and/or iterations number (if used).

At 340, the encrypted challenge is decrypted using the regenerated shared key. The challenge may be displayed (e.g., in plaintext) to the user on the user computing device 398. The user provides proof of successful decryption of the challenge issued by the host computing device as the challenge response. For example, if the user is using another computing device (not shown) to access the host computing device 397, the user may type the displayed challenge into the other computing device for transmission to the host computing device 397. Additionally or alternatively, the user computing device 398 may transmit (e.g., by text message, by email, by any long or short distance wired or wireless standard, etc.) the decrypted challenge to the host computing device 397 as the challenge response. Additionally or alternatively, the user computing device 398 may hash the challenge before displaying the challenge or transmitting the challenge, and the hashed challenge is the challenge response.

At 350, the received challenge response is compared with the challenge (from 325). If there is a match, the user's authentication request (e.g., login) is granted. If there is not a match, the user's authentication request is denied. If the challenge response is the result of hashing, the challenge needs to be hashed before the comparison can be executed.

Those skilled in the art, having the benefit of this detailed description, will appreciate that a new ephemeral public-private key pair, a new challenge, and a new salt or iterations number (if used) are generated for each login request, which increases the security of the login process. Further, the process depicted in FIG. 3 does not utilize passwords and thus overcomes the many issues associated with passwords such as, for example, securely storing the password, users forgetting passwords, users re-using old passwords, software that logs keystrokes, etc.

In one or more embodiments, to prevent or reduce the likelihood of a successful race condition attack, host computing device 397 may generate a nonce (e.g., a code) in response to the authentication request. The nonce may be transmitted to ICD 396, and ICD 396 may cause the nonce to be displayed on user computing device 398 (e.g., in a browser). ICD 396 may also push a set of nonces (including the displayed nonce) to appear in a notification on the user computing device 398. The user may need to select, from among the set of nonces, the nonce matching the displayed nonce. The selection may be transmitted with the challenge response (or be part of the challenge response) to the host computing device. In one or more embodiments, the authentication request is only successful if the correct (i.e., matching) selection is made by the user. In one or more embodiments, the salt (used for the KDF) and the nonce are the same. In one or more embodiments, the salt and the nonce are different. In one or more embodiments, the salt is combined with the nonce before it is inputted into the KDF to generate the shared key. In one or more embodiments, the nonce may be a separate input to the KDF.

FIG. 4A and FIG. 4B show a flow diagram for password-less authentication using key agreement and MPC in accordance with one or more embodiments. As shown, the flow diagram involves interactions between a user computing device 498, a host computing device 497, and an intermediate computing device 496. The user computing device 498, the host computing device 497, and the intermediate computing device 496 may correspond to user computing device 198, host computing device 197, and intermediate computing device 196, respectively, discussed above in reference to FIG. 1. The user computing device 498 may correspond to a desktop PC, a laptop PC, a tablet PC, a smart phone, a terminal, a kiosk, etc. The host computing device 497 and the intermediate computing device 496 may correspond to a server, a mainframe, a desktop PC, a container in a data center, etc. The process depicted in FIG. 4A and FIG. 4B does not require the host computing device 497 to store a password for the user.

At 405, a long-lived user public-private key pair is generated. In other words, a long-lived user public key and a long-lived user private key are generated. The long-lived user public-private key pair may be an EC public-private key pair generated based on a set of domain parameters. Accordingly, the long-lived user private key may be a randomly selected integer, while the long-lived user public key may be represented by a point that is based on the randomly selected integer and a generator point. The long-lived user public key may be sent the intermediate computing device 496 for storage. The long-lived user private key may be split into N portions. For example, when N is 3, one portion may be stored on the user computing device 498, one portion may be stored with the intermediate computing device 496, while the other portion may be a personal identification number (PIN) known only to the user.

At 407, a long-lived ICD public-private key pair is generated. In other words, a long-lived ICD public key and a long-lived ICD private key are generated. Like the long-lived user public-private key pair (in 405), the long-lived ICD public-private key pair may be an EC public-private key pair. The long-lived ICD public key may be sent to host computing device 497 or stored in a location (e.g., file) accessible to host computing device 497. The long-lived ICD private key is stored by intermediate computing device 496 and kept secret.

At 410, the host computing device 497 receives an authentication request (e.g., login request) associated with the user. The user might be attempting to remotely access (e.g., over the internet) the host computing device 497 via the user computing device 498 (or another computing device not shown). The login request may include an identifier for the user such as a username, employee number, student ID, identification number, etc.

At 415, the host computing device 397 obtains the long-lived ICD public key (generated in 407) in response to the authentication request.

At 420, an ephemeral public-private key pair is generated. In other words, an ephemeral public key and an ephemeral private key are generated by the host computing device. The generated ephemeral public-private key pair may be an EC public-private key pair. In such scenarios, the ephemeral public-private key pair on the host computing device is generated using the same domain parameters as used at 407.

Still referring to 420, a shared key is generated based on the ephemeral private key and the long-lived ICD public key (from 415). This may include first generating an auxiliary key according to the ECDH key protocol, and then applying the auxiliary key to a KDF. The KDF inputs the auxiliary key and an optional salt which acts as a cryptographic salt. The salt may be a random number generated by the host computing device 497 in response to the authentication request. Additionally or alternatively, the salt may be the value of some memory location or register in the host computing device 497 at the time the authentication request is received. In one or more embodiments, the salt may be based on the time (e.g., any combination of hours, minutes, seconds, etc.) that the authentication request was received by the host computing device 397. Some KDF algorithms may also use an optional iterations number. The output of the KDF is the shared key. The shared key may be an Advanced Encryption Standard (AES) key. In one or more embodiments, the KDF is omitted, in which case the shared key is the auxiliary key.

At 425, a challenge is generated and encrypted by the shared key. The challenge may be a random number or random string generated by the host computing device 497. Then, the encrypted challenge, the ephemeral public key, and the salt and/or iterations number (if used) are transmitted to the intermediate computing device 496. The identifier (from 410) may also be transmitted to the intermediate computing device 496. The salt and/or iterations number (if used) may be sent to the intermediate computing device 496 using a channel that is different from the channel used to transmit the encrypted challenge and the ephemeral public key.

At 435, the shared key (from 420) is regenerated by the intermediate computing device. This may include regenerating the auxiliary key (from 220) based on the ephemeral public key (as received from the host computing device 497) and the long-lived ICD private key (from 407) using the ECDH key protocol. Then, the shared key is regenerated by applying the same KDF to the regenerated auxiliary key with the received salt and/or iterations number (if used).

At 440, the encrypted challenge is decrypted by the ICD 496 using the regenerated shared key.

At 445, an ephemeral ICD public-private key pair is generated. In other words, an ephemeral ICD public key B and an ephemeral ICD private key are generated. Like the long-lived user public-private key pair (in 405), the ephemeral ICD public-private key pair may be an EC public-private key pair. In such scenarios, the ephemeral ICD public-private key pair is generated using the same domain parameters as used at 405.

At 450, a new shared key is generated based on the ephemeral ICD private key (from 445) and the long-lived user public key (from 405). The new shared key at 450 is different from the shared key at 420. Generating the new shared key may include first generating a new auxiliary key using the long-lived user public key (from 405) and the ephemeral ICD private key (from 445) according to the ECDH key protocol, and then applying the new auxiliary key to a KDF. The KDF inputs the new auxiliary key, an optional salt which acts as a cryptographic salt, and (depending on the algorithm used) an optional iterations number. The salt may be a random number generated by the intermediate computing device 496 in response to receiving the encrypted challenge. Additionally or alternatively, the salt may be the value of some memory location or register in the intermediate computing device 496 at the time the encrypted challenge is received. The output of the KDF is the new shared key. The new shared key may be an Advanced Encryption Standard (AES) key. In one or more embodiments, the KDF is omitted, in which case the new shared key is the new auxiliary key. At 455, the decrypted challenge (from 440) is re-encrypted using the new shared key.

At 460, if the long-lived user private key has been split into multiple portions with one of the portions stored with the intermediate computing device 496 (discussed above in reference to 405), then the intermediate computing device 496 calculates a partial key agreement result based on the portion of the long-lived user private key stored in the intermediate computing device 496 and the ephemeral ICD public key (generated at 445). As the intermediate computing device 496 may store portions for multiple long-lived user private keys for multiple users, the intermediate computing device 496 may use the identifier (received from the host computing device 497) to retrieve the portion of the long-lived user private key associated with the user trying to access the host computing device 497. Then, the partial key agreement, the encrypted challenge, and ephemeral ICD public key may be transmitted to the user computing device 498.

In one or more embodiments, if a salt and/or iterations number was used to generate the new shared key in 450, then the salt and/or iterations number may be transmitted to the user computing device 498 via email, SMS, or by some other wired or wireless channel separate from the channel/method used to transmit the ephemeral public key B, the encrypted challenge, and the partial key agreement to user computing device 498.

At 465, the new shared key (from 450) is regenerated by the user computing device 498. This may include regenerating the new auxiliary key (from 450) based on the ephemeral ICD public key and the long-lived user private key using the ECDH key protocol. Regenerating the new auxiliary key may involve completing the key agreement based on the partial key agreement result (as received from the intermediate computing device), the second portion of the long-lived user private key stored by the user computing device 498, the third portion of the long-lived user private key (e.g., PIN provided by user), and the ephemeral ICD public key. Then, the new shared key is regenerated by applying the same KDF (as used in 450) to the regenerated new auxiliary key using the salt and/or iterations number.

At 470, the encrypted challenge is decrypted using the regenerated shared key. The challenge may be displayed (e.g., in plaintext) to the user on the user computing device 498. The user provides proof of successful decryption of the challenge issued by the host computing device as the challenge response. For example, if the user is using another computing device (not shown) to access the host computing device 497, the user may type the displayed challenge into the other computing device for transmission to the host computing device 497. Additionally or alternatively, the user computing device 498 may transmit (e.g., by text message, by email, by any long or short distance wired or wireless standard, etc.) the decrypted challenge to the host computing device 497 as the challenge response. Additionally or alternatively, the user computing device 498 may hash the challenge before displaying the challenge or transmitting the challenge, and the hashed challenge is the challenge response.

At 480, the received challenge response is compared with the challenge (from 425). If there is a match, the user's authentication request (e.g., login request) is granted. If there is not a match, the user's authentication request is denied. If the challenge response is the result of hashing, the challenge needs to be hashed before the comparison can be executed.

Those skilled in the art, having the benefit of this detailed description, will appreciate that by using the process shown in FIG. 4A and FIG. 4B, a new ephemeral public-private key pair for the host, a new challenge, a new ephemeral ICD public-private key pair, and a new salt and/or iterations number (if used) are generated for each authentication request, which increases the security of the authentication process. Further, the process depicted in FIG. 4A and FIG. 4B does not utilize passwords and thus overcomes the many issues associated with passwords such as, for example, securely storing the password, users forgetting passwords, users re-using old passwords, software that logs keystrokes, etc.

In one or more embodiments, by using the process shown in FIG. 4A and FIG. 4B, the host computing device 497 does not require access to all of the long-lived public keys for all the users (e.g., each host computing device does not require a directory). Instead, the host computing device 497 only requires the long-lived ICD public key (from 407). In FIG. 4A and FIG. 4B, management of the long-lived public keys for the users are delegated to the ICD 496, and multiple host computing devices may utilize the ICD 496.

In one or more embodiments, to prevent or reduce the likelihood of a successful race condition attack, host computing device 497 may generate a nonce (e.g., a code) in response to the authentication request. The nonce may be transmitted to ICD 496, and ICD 496 may cause the nonce to be displayed on user computing device 498 (e.g., in a browser). ICD 496 may also push a set of nonces (including the displayed nonce) to appear in a notification on the user computing device 498. The user may need to select, from among the set of nonces, the nonce matching the displayed nonce. The selection may be transmitted with the challenge response (or be part of the challenge response) to the host computing device. In one or more embodiments, the authentication request is only successful if the correct (i.e., matching) selection is made by the user. In one or more embodiments, the salt (used for the KDF) and the nonce are the same. In one or more embodiments, the salt and the nonce are different. In one or more embodiments, the salt is combined with the nonce before it is inputted into the KDF to generate the shared key. In one or more embodiments, the nonce may be a separate input to the KDF.

In one or more embodiments, step 445 may be omitted. In such embodiments, steps, 450, 455, 460, and 465 may utilize the long-lived ICD public-private key pair (from 407) instead of the ephemeral ICD public-private key pair that would have been generated at 445.

Although the descriptions of FIG. 2, FIG. 3, FIG. 4A, and FIG. 4B explicitly mention the ECDH key protocol, other embodiments may use different protocols to generate keys. In fact some embodiments may utilize post-quantum cryptography algorithms including, but not limited to, Classic McEliece, CRYSTALS-KYBER, NTRU, SABER, etc.

Although the embodiments described above focus heavily on authentication requests, the processes shown in FIG. 2, FIG. 3, and FIGS. 4A & 4B are applicable to other transaction types including, for example, identification confirmation. An attribute (e.g., code) identifying the type of transaction (e.g., authentication request, identification confirmation, etc.) may be inserted at the start of the challenge, at the end of the challenge, or somewhere within the challenge. In order for the transaction to be granted, the challenge response should include the same attribute. If the challenge response has a different attribute (e.g., there is an attribute mismatch between the challenge and the challenge response), the transaction should be denied.

Various embodiments can be implemented, for example, using one or more computer systems, such as computer system 500 shown in FIG. 5. One or more computer systems 500 can be used, for example, to implement the processes shown in FIGS. 2, 3, 4A, and 4B. Computer system 500 can be any computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, encryption key generation, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   obtaining, by a host computing device in response to an authentication request including an identifier for a user associated with the authentication request, a long-lived public key based on the identifier, wherein the long-lived public key is associated with a long-lived private key;
   generating, by the host computing device, an ephemeral public-private key pair in response to receiving the authentication request, the ephemeral public-private key pair comprising an ephemeral public key and an ephemeral private key;
   generating, by the host computing device, a first shared key based on the long-lived public key and the ephemeral private key;
   encrypting, by the host computing device, a challenge using the first shared key to generate an encrypted challenge; and
   granting, by the host computing device, the authentication request associated with the user based on a comparison associated with the challenge and a challenge response received by the host computing device, wherein the challenge response is generated after decrypting the encrypted challenge with the first shared key regenerated using the ephemeral public key and the long-lived private key.

2. The method of claim 1, wherein obtaining the long-lived public key comprises:
   extracting the identifier from the authentication request; and
   retrieving the long-lived public key by searching a directory service based on the identifier.

3. The method of claim 1, wherein generating the first shared key comprises:
   generating an auxiliary key based on the long-lived public key and the ephemeral private key on the host computing device; and
   applying a key derivative function (KDF) to the auxiliary key,
   wherein the first shared key is an output of the KDF.

4. The method of claim 3, further comprising:
   transmitting, by the host computing device, the encrypted challenge and the ephemeral public key;
   transmitting, by the host computing device, a salt separately from the encrypted challenge and the ephemeral public key,
   wherein the salt is an input to the KDF, and
   wherein the first shared key is generated by the KDF based on the salt; and
   reducing a likelihood of a successful race condition attack using a nonce that is either the same as the salt or different than the salt.

5. The method of claim 4, wherein the ephemeral public-private key pair is an elliptic-curve (EC) key pair, and wherein the nonce is an input to the KDF.

6. The method of claim 1, further comprising:
   receiving, by an intermediate computing device (ICD), the ephemeral public key from the host computing device;
   calculating, by the ICD, a partial key agreement result based on the ephemeral public key and a first portion of the long-lived private key; and
   transmitting, by the ICD, the partial key agreement result to a user computing device comprising a second portion of the long-lived private key,
   wherein the user computing device regenerates the first shared key based on the second portion of the long-lived private key, a personal identification number (PIN) provided by the user, and the partial key agreement result,
   wherein the long-lived public key is a long-lived user public key and the long-lived private key is a long-lived user private key,
   wherein the user computing device generates the challenge response by decrypting the encrypted challenge using the regenerated first shared key, and
   wherein the user computing device transmits the challenge response to the host computing device.

7. The method of claim 1, further comprising:
   regenerating, by an intermediary computing device (ICD), the first shared key using the long-lived private key and the ephemeral public key, wherein the long-lived public key is a long-lived ICD public key and the long-lived private key is a long-lived ICD private key;
   decrypting, by the ICD, the encrypted challenge using the regenerated first shared key;
   generating, by the ICD, a second shared key based on a long-lived user public key associated with the user, wherein the long-lived user public key belongs to a long-lived user public-private key pair comprising a long-lived user private key;
   re-encrypting, by the ICD, the challenge using the second shared key; and
   transmitting the re-encrypted encrypted challenge to a user computing device,
   wherein the user computing device regenerates the second shared key based on the long-lived user private key, and
   wherein the user computing device generates the challenge response by decrypting the re-encrypted encrypted challenge using the regenerated second shared key.

8. The method of claim 7, further comprising:
   generating, by the ICD, an ephemeral ICD public-private key pair comprising an ephemeral ICD public key and an ephemeral ICD private key,
   wherein the second shared key is generated further based on the ephemeral ICD private key; and
   transmitting the ephemeral ICD public key to the user computing device,
   wherein the user computing device regenerates the second shared key further based on the ephemeral ICD public key.

9. The method of claim 7, wherein the long-lived user private key is split into a plurality of portions including a portion stored on the ICD, a portion stored on the user computing device, and a personal identification number (PIN) known to the user.

10. The method of claim 1, further comprising:
    receiving, by the host computing device, an identification confirmation associated with the user;
    inserting, by the host computing device, an attribute to identify a type of a transaction within the challenge, wherein the type of the transaction is associated with the user and includes the authentication request and the identification confirmation; and
    granting, by the host computing device, the transaction based on a comparison of the attribute within the challenge and within the challenge response,
    wherein the attribute within the challenge response includes the type of the transaction.

11. A system, comprising:
    a host computing device configured to:
    obtain, in response to an authentication request including an identifier for a user associated with the authentication request, a long-lived public key based on the identifier, wherein the long-lived public key is associated with a long-lived private key;
    generate an ephemeral public-private key pair in response to receiving the authentication request, the ephemeral public-private key pair comprising an ephemeral public key and an ephemeral private key;
    generate a first shared key based on the long-lived public key and the ephemeral private key;
    encrypt a challenge using the first shared key to generate an encrypted challenge; and
    grant the authentication request associated with the user based on a comparison associated with the challenge and a challenge response received by the host computing device,
    wherein the challenge response is generated after decrypting the encrypted challenge with the first shared key regenerated using the ephemeral public key and the long-lived private key.

12. The system of claim 11, further comprising:
    reducing a likelihood of a successful race condition attack using a nonce, wherein the host computing device generates the first shared key by:
  generating an auxiliary key based on the long-lived public key and the ephemeral private key;
  applying a key derivative function (KDF) to the auxiliary key and a salt,
  wherein the auxiliary key and the salt are inputs to the KDF,
  wherein the first shared key is an output of the KDF,
  wherein the salt is transmitted using a channel different from the channel used to transmit the encrypted challenge and the ephemeral public key, and
  wherein the nonce is either the same as the salt or different than the salt.

13. The system of claim 11, further comprising:
an intermediate computing device (ICD) configured to:
  receive the ephemeral public key;
  calculate a partial key agreement result based on the ephemeral public key and a first portion of the long-lived private key; and
  transmit the partial key agreement result to a user computing device comprising a second portion of the long-lived private key,
  wherein the user computing device regenerates the first shared key based on the second portion of the long-lived private key, a personal identification number (PIN) provided by the user, and the partial key agreement result,
  wherein the long-lived public key is a long-lived user public key and the long-lived private key is a long-lived user private key,
  wherein the user computing device generates the challenge response by decrypting the encrypted challenge using the regenerated first shared key, and
  wherein the user computing device transmits the challenge response to the host computing device.

14. The system of claim 11, further comprising:
an intermediate computing device (ICD) configured to:
  regenerate the first shared key using the long-lived private key and the ephemeral public key, wherein the long-lived public key is a long-lived user public key and the first private key is a long-lived ICD private key;
  decrypt the encrypted challenge using the regenerated first shared key;
  generate a second shared key based on a long-lived user public key associated with the user, wherein the long-live user public key belongs to a long-lived user public-private key pair comprising a long-lived user private key;
  re-encrypt the challenge using the second shared key; and
  transmit the re-encrypted challenge to a user computing device,
  wherein the user computing device regenerates the second shared key based on the second long-lived user key, and
  wherein the user computing device generates the challenge response by decrypting the re-encrypted challenge using the regenerated second shared key.

15. The system of claim 14, wherein the ICD is further configured to:
  generate an ephemeral ICD public-private key pair comprising an ephemeral ICD public key and an ephemeral ICD private key,
  wherein the second shared key is generated further based on the ephemeral ICD private key; and
  transmit the ephemeral ICD public key to the user computing device,
  wherein the user computing device regenerates the second shared key further based on the ephemeral ICD public key.

16. A non-transitory computer readable medium (CRM) having instructions stored thereon, the instructions, when executed by at least one computing device, cause the at least one computing device to perform operations comprising:
  obtaining, in response to an authentication request including an identifier for a user associated with the authentication request, a long-lived public key based on the identifier, wherein the long-lived public key is associated with a long-lived private key;
  generating an ephemeral public-private key pair in response to receiving the authentication request, the ephemeral public-private key pair comprising an ephemeral public key and an ephemeral private key;
  generating a first shared key based on the long-lived public key and the ephemeral private key;
  encrypting a challenge using the first shared key to generate an encrypted challenge; and
  granting the authentication request associated with the user based on a comparison associated with the challenge and a challenge response received by the at least one computing device,
  wherein the challenge response is generated after decrypting the encrypted challenge with the first shared key regenerated using the ephemeral public key and the long-lived private key.

17. The non-transitory CRM of claim 16, the operations further comprising:
  reducing a likelihood of a successful race condition attack using a nonce,
  wherein generating the first shared key comprises:
    generating an auxiliary key based on the long-lived public key and the ephemeral private key; and
    applying a key derivative function (KDF) to the auxiliary key and a salt,
    wherein the auxiliary key and the salt are inputs to the KDF,
    wherein the first shared key is an output of the KDF, and
    wherein the nonce is either the same as the salt or different than the salt.

18. The non-transitory CRM of claim 16, wherein the encrypted challenge and the ephemeral public key are transmitted to an intermediate computing device (ICD) configured to:
  calculate a partial key agreement result based on the ephemeral public key and a first portion of the long-lived private key; and
  transmit the partial key agreement result to a user computing device comprising a second portion of the long-lived private key,
  wherein the user computing device regenerates the first shared key based on the second portion of the long-lived private key, a personal identification number (PIN) provided by the user, and the partial key agreement result,
  wherein the long-lived public key is a long-lived user public key and the long-lived private key is a long-lived user private key,
  wherein the user computing device generates the challenge response by decrypting the encrypted challenge using the regenerated first shared key, and wherein the user computing device transmits the challenge response for the comparison.

19. The non-transitory CRM of claim 16, wherein the encrypted challenge and the ephemeral public key are transmitted to an intermediate computing device (ICD) configured to:
- regenerate the first shared key using the long-lived private key and the ephemeral public key, wherein the long-lived public key is a long-lived ICD public key and the long-lived private key is a long-lived ICD private key;
- decrypt the encrypted challenge using the regenerated first shared key;
- generate a second shared key based on a long-lived user public key associated with the user, wherein the long-lived user public key belongs to a long-lived user public-private key pair comprising a long-lived user private key;
- re-encrypt the challenge using the second shared key; and
- transmit the re-encrypted challenge to a user computing device, wherein the user computing device regenerates the second shared key based on the long-lived user private key, and wherein the user computing device generates the challenge response by decrypting the re-encrypted encrypted challenge using the regenerated second shared key.

20. The non-transitory CRM of claim 19, wherein the ICD is further configured to:
- generate an ephemeral ICD public-private key pair comprising an ephemeral ICD public key and an ephemeral ICD private key, wherein the second shared key is generated further based on the ephemeral ICD private key; and
- transmit the ephemeral ICD public key to the user computing device, wherein the user computing device regenerates the second shared key further based on the ephemeral ICD public key.

* * * * *

UNITED STATES PATENT AND TRADEMARK OFFICE
CERTIFICATE OF CORRECTION

PATENT NO.         : 11,743,044 B2
APPLICATION NO.    : 17/480806
DATED              : August 29, 2023
INVENTOR(S)        : Peddada et al.

It is certified that error appears in the above-identified patent and that said Letters Patent is hereby corrected as shown below:

In the Specification

In Column 3, Line 49, delete "Nis" and insert -- N is --, therefor.

In Column 4, Line 4, delete "a" and insert -- an --, therefor.

In Column 6, Line 34, delete "Nis" and insert -- N is --, therefor.

In Column 9, Line 15, delete "Nis" and insert -- N is --, therefor.

Signed and Sealed this
Nineteenth Day of December, 2023

Katherine Kelly Vidal
*Director of the United States Patent and Trademark Office*